United States Patent
Denner et al.

(10) Patent No.: US 8,370,189 B2
(45) Date of Patent: Feb. 5, 2013

(54) SYSTEM AND METHOD FOR AUTOMATIC MODERATOR DELEGATION

(75) Inventors: Gary Denner, Kildare (IE); Patrick Joseph O'Sullivan, Ballsbridge (IE); Sean Callanan, Churchtown (IE); Al Chakra, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/416,623

(22) Filed: Mar. 9, 2012

(65) Prior Publication Data

US 2012/0166245 A1 Jun. 28, 2012

Related U.S. Application Data

(63) Continuation of application No. 11/866,477, filed on Oct. 3, 2007, now Pat. No. 8,160,912.

(51) Int. Cl.
*G06Q 10/00* (2012.01)

(52) U.S. Cl. .................................. 705/7.19

(58) Field of Classification Search ......... 705/7.11–7.42
See application file for complete search history.

(56) References Cited

U.S. PATENT DOCUMENTS

| | | | |
|---|---|---|---|
| 4,280,216 A * | 7/1981 | Zeitrag | 370/267 |
| 4,577,065 A * | 3/1986 | Frey et al. | 379/204.01 |
| 4,691,347 A * | 9/1987 | Stanley et al. | 379/203.01 |
| 5,369,693 A | 11/1994 | Pillet et al. | |
| 5,828,838 A * | 10/1998 | Downs et al. | 709/204 |
| 5,903,637 A | 5/1999 | Hogan et al. | |
| 6,598,075 B1 | 7/2003 | Ogdon et al. | |
| 6,757,530 B2 | 6/2004 | Rouse et al. | |
| 6,823,363 B1 * | 11/2004 | Noveck et al. | 709/204 |
| 6,839,417 B2 | 1/2005 | Weisman et al. | |
| 7,133,896 B2 | 11/2006 | Ogdon et al. | |
| 7,379,968 B2 | 5/2008 | Schuh | |
| 7,533,146 B1 | 5/2009 | Kumar | |
| 7,634,546 B1 | 12/2009 | Strickholm et al. | |
| 7,765,257 B2 | 7/2010 | Chen et al. | |
| 7,953,622 B2 * | 5/2011 | Ogle et al. | 705/7.19 |
| 7,953,623 B2 * | 5/2011 | Ogle et al. | 705/7.29 |
| 8,160,912 B2 * | 4/2012 | Denner et al. | 705/7.19 |
| 2002/0138569 A1 * | 9/2002 | Slutsman et al. | 709/204 |
| 2002/0147604 A1 * | 10/2002 | Slate et al. | 705/1 |
| 2003/0046344 A1 | 3/2003 | Kumhyr et al. | |
| 2004/0047461 A1 | 3/2004 | Weisman et al. | |
| 2004/0105395 A1 | 6/2004 | Friedrich et al. | |
| 2004/0158629 A1 * | 8/2004 | Herbeck et al. | 709/224 |
| 2004/0205134 A1 | 10/2004 | Digate et al. | |
| 2005/0036509 A1 | 2/2005 | Acharya et al. | |

(Continued)

OTHER PUBLICATIONS

Breeze Meeting User Guide for Meeting Participants, 2005, Macromedia, Inc., pp. 1-50.

(Continued)

*Primary Examiner* — Lynda Jasmin
*Assistant Examiner* — Alan S Miller
(74) *Attorney, Agent, or Firm* — Holland & Knight LLP; Brian J. Colandreo, Esq.; Michael T. Abramson, Esq.

(57) ABSTRACT

A method and computer program product for receiving an indication of a meeting being scheduled between a plurality of attendees. At least one of the attendees is designated a moderator of the meeting. The actions of the designated moderator are monitored to determine if the designated moderator is capable of performing one or more moderator responsibilities associated with being the designated moderator. If it is determined that the designated moderator is incapable of performing the one or more moderator responsibilities, an alternate moderator chosen from the plurality of attendees is designated.

20 Claims, 5 Drawing Sheets

U.S. PATENT DOCUMENTS

| | | | |
|---|---|---|---|
| 2005/0091380 A1* | 4/2005 | Gonen et al. | 709/227 |
| 2005/0132048 A1* | 6/2005 | Kogan et al. | 709/225 |
| 2005/0152523 A1 | 7/2005 | Fellenstein et al. | |
| 2005/0273510 A1 | 12/2005 | Schuh | |
| 2006/0080657 A1 | 4/2006 | Goodman | |
| 2006/0224430 A1 | 10/2006 | Butt | |
| 2006/0234613 A1 | 10/2006 | Hans et al. | |
| 2006/0235736 A1 | 10/2006 | Guckenheimer | |
| 2006/0265262 A1 | 11/2006 | Kamdar et al. | |
| 2007/0067387 A1* | 3/2007 | Jain et al. | 709/204 |
| 2007/0150583 A1* | 6/2007 | Asthana et al. | 709/224 |
| 2007/0174104 A1* | 7/2007 | O'Sullivan et al. | 705/9 |
| 2008/0052354 A1* | 2/2008 | Barber-Mingo et al. | 709/204 |
| 2008/0288316 A1* | 11/2008 | Chakra et al. | 705/8 |
| 2009/0055236 A1* | 2/2009 | O'Sullivan et al. | 705/8 |

OTHER PUBLICATIONS

GoToMeeting User Guide Version 2.0 (Product Release Aug. 2005), pp. 1-81.

The Christian Church (Disciples of Christ) in Georgia, "Constitution & By-Laws," published on the world wide web on Mar. 9, 2002, referenced in "gadisciples, pdf" with view of Wayback Machine Website: http://web.archive.org/web/20020309200150/http://gadisciples.org/about_us/constitution.htm.

General Henry Martyn Robert, "Roberts Rules of Order," referenced in "Robert's Rules of Order, Google Books.pdf," to show that it was originally published in Feb. 1876, and can be applied to electronic meetings.

* cited by examiner

US 8,370,189 B2

SYSTEM AND METHOD FOR AUTOMATIC MODERATOR DELEGATION

The subject application is a continuation application of U.S. patent application Ser. No. 11/866,477, filed 3 Oct. 2007, now issued as U.S. Pat. No. 8,160,912 on 17 Apr. 2012, the entire contents of which is herein incorporated by reference.

TECHNICAL FIELD

This disclosure relates to meeting moderators and, more particularly, to the automatic delegation of meeting moderators based upon activity patterns.

BACKGROUND

Today, technology exists that allows a member of an organization to send meeting invites to other members of the organization so that meetings may be scheduled to e.g., discuss various topics of interest within the group of attendees. These meetings may be in person meetings or may be virtual meetings that occur through instant messaging systems, phone systems, video conference systems, electronic whiteboard systems or any combination thereof.

Typically, a moderator is designated for each meeting. The moderator may have specific rights/obligations that the other attendees of the meeting do not have. Unfortunately, in the event that the assigned moderator does not live up to their obligations, difficulties may arise. For example, if the designated moderator is out sick the week immediately preceding the meeting and the meeting needs to be rescheduled, as only the moderator of the meeting may reschedule the meeting, the meeting may not be rescheduled in the moderator's absence. Further, if a new member has joined the team and doesn't have the meeting in their calendar, the new team member will have to wait until the moderator returns before they can be added to the meeting attendee list.

SUMMARY OF DISCLOSURE

In a first implementation, a method includes receiving an indication of a meeting being scheduled between a plurality of attendees. At least one of the attendees is designated a moderator of the meeting. The actions of the designated moderator are monitored to determine if the designated moderator is capable of performing one or more moderator responsibilities associated with being the designated moderator. If it is determined that the designated moderator is incapable of performing the one or more moderator responsibilities, an alternate moderator chosen from the plurality of attendees is designated.

One or more of the following features may be included. The meeting may be an in-person meeting. The meeting may be a virtual meeting chosen from the group consisting of: an instant-message based meeting; a web-based meeting; a telephone conference; and a video conference.

Monitoring the actions of the designated moderator may include determining how long it has been since the designated moderator has logged in to their computer system. Monitoring the actions of the designated moderator may include determining how long it has been since the designated moderator has accessed their email account. Monitoring the actions of the designated moderator may include determining how long it has been since the designated moderator has logged into their instant messaging account. Monitoring the actions of the designated moderator may include determining how long it has been since the designated moderator has checked their voice mail.

Designating an alternate moderator chosen from the plurality of attendees may include determining a next most-senior attendee from the plurality of attendees and designating the next most-senior attendee as the alternate moderator. The actions of the designated moderator may be continuously monitored after the designation of an alternate moderator to determine if the designated moderator is again capable of performing the one or more moderator responsibilities associated with being the designated moderator. If it is determined that the designated moderator is again capable of performing the one or more moderator responsibilities, the alternate moderator may be undesignated and the designated moderator may be redesignated.

In another implementation, a computer program product resides on a computer readable medium that has a plurality of instructions stored on it. When executed by a processor, the instructions cause the processor to perform operations including receiving an indication of a meeting being scheduled between a plurality of attendees. At least one of the attendees is designated a moderator of the meeting. The actions of the designated moderator are monitored to determine if the designated moderator is capable of performing one or more moderator responsibilities associated with being the designated moderator. If it is determined that the designated moderator is incapable of performing the one or more moderator responsibilities, an alternate moderator chosen from the plurality of attendees is designated.

One or more of the following features may be included. The meeting may be an in-person meeting. The meeting may be a virtual meeting chosen from the group consisting of: an instant-message based meeting; a web-based meeting; a telephone conference; and a video conference.

Monitoring the actions of the designated moderator may include determining how long it has been since the designated moderator has logged in to their computer system. Monitoring the actions of the designated moderator may include determining how long it has been since the designated moderator has accessed their email account. Monitoring the actions of the designated moderator may include determining how long it has been since the designated moderator has logged into their instant messaging account. Monitoring the actions of the designated moderator may include determining how long it has been since the designated moderator has checked their voice mail.

Designating an alternate moderator chosen from the plurality of attendees may include determining a next most-senior attendee from the plurality of attendees and designating the next most-senior attendee as the alternate moderator. The actions of the designated moderator may be continuously monitored after the designation of an alternate moderator to determine if the designated moderator is again capable of performing the one or more moderator responsibilities associated with being the designated moderator. If it is determined that the designated moderator is again capable of performing the one or more moderator responsibilities, the alternate moderator may be undesignated and the designated moderator may be redesignated.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
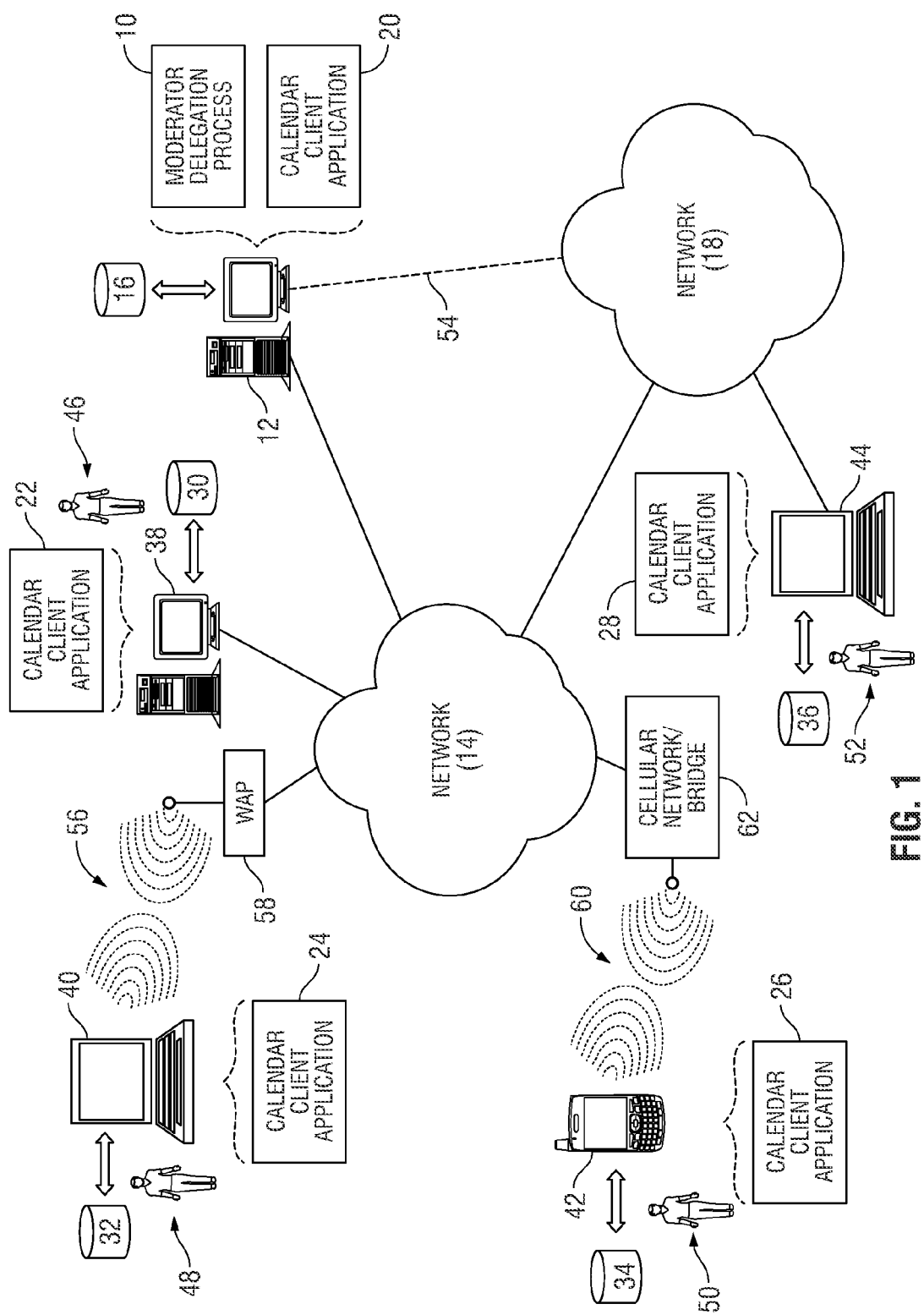
FIG. 1 is a diagrammatic view of a moderator delegation process, a calendar client application and a calendar server application coupled to a distributed computing network.

System Overview:

Referring to FIG. 1, there is shown moderator delegation process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

As will be discussed below in greater detail, moderator delegation process 10 may receive an indication of a meeting being scheduled between a plurality of attendees. At least one of the attendees may be designated a moderator of the meeting. The actions of the designated moderator may be monitored to determine if the designated moderator is capable of performing the moderator responsibilities associated with being the designated moderator. If it is determined that the designated moderator is incapable of performing the moderator responsibilities, an alternate moderator chosen from the plurality of attendees may be designated.

The instruction sets and subroutines of moderator delegation process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute calendar server application 20, examples of which may include but are not limited to Lotus Domino™ Server and Microsoft Exchange™ Server. Calendar server application 20 may be a messaging and collaboration software platform that may allow for user collaboration via calendar client applications 22, 24, 26, 28, examples of which may include but are not limited to Lotus Notes™ and Microsoft Outlook™. Moderator delegation process 10 may be a stand alone application that interfaces with calendar server application 20 or an applet/application that is executed within calendar server application 20.

The instruction sets and subroutines of calendar server application 20, which may be stored on storage device 16 coupled to server computer 12 may be executed by one or more processors (not shown) and one or more memory architectures (not shown) incorporated into server computer 12.

The instruction sets and subroutines of calendar client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using calendar client applications 22, 24, 26, 28, users 46, 48, 50, 52 may access calendar server application 20 and may allow users to e.g., schedule in-person meetings, instant-message based meetings; web-based meetings; telephone conferences; and video conferences.

Users 46, 48, 50, 52 may access calendar server application 20 directly through the device on which the calendar client application (e.g., calendar client applications 22, 24, 26, 28) is executed, namely client electronic devices 38, 40, 42, 44, for example. Users 46, 48, 50, 52 may access calendar server application 20 directly through network 14 or through secondary network 18. Further, server computer 12 (i.e., the computer that executes calendar server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Moderator Delegation Process:

For the following discussion, calendar client application 22 is going to be described for illustrative purposes. However, this is not intended to be a limitation of this disclosure, as other calendar client applications (e.g., calendar client applications 24, 26, 28) may be equally utilized.

Figure 2:
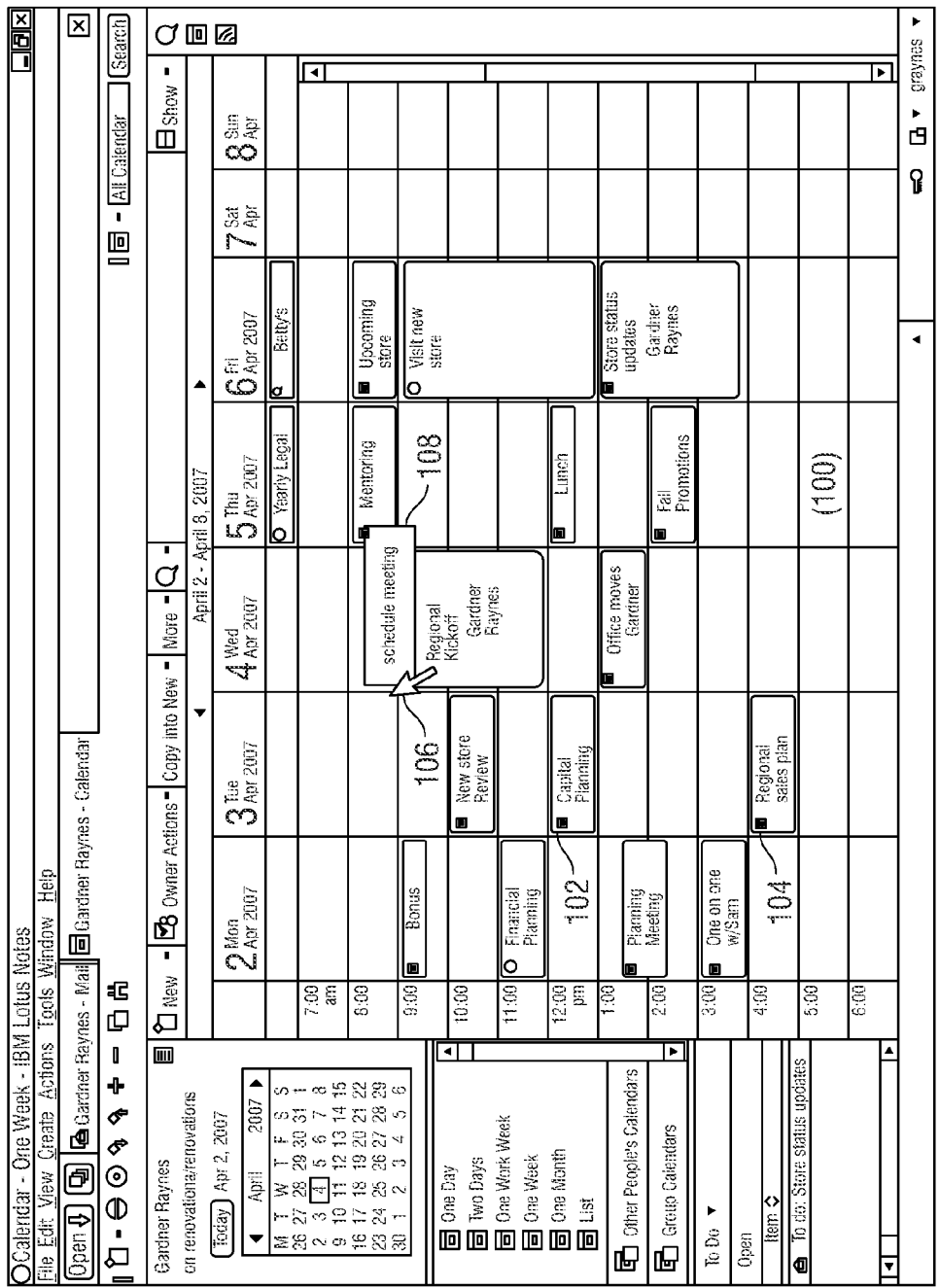
FIG. 2 is a diagrammatic view of a display screen rendered by the calendar client application and/or the calendar server application of FIG. 1.

Referring also to FIG. 2, calendar client application 22 may allow user 46 to schedule meetings through a visual calendaring interface 100. Through visual calendaring interface 100, user 46 may schedule meetings with one or more users (e.g. user 48, user 50, user 52). Accordingly, meeting 102 (which is scheduled from 12:00-1:00 p.m. on Tuesday, 3 Apr. 2007) may be a meeting to which user 46, user 50 and user 52 are scheduled to attend. Further, meeting 104 (which is scheduled from 4:15-5:15 p.m. on Tuesday 3 Apr. 2007) may be a meeting to which user 46, user 48 and user 50 are scheduled to attend.

When scheduling meetings, user 46 may select the time period for which the meeting is to be scheduled. For example, user 46 may select, via on-screen pointer 106 (which is controlled by a pointing device such as a mouse; not shown), the desired time period (e.g., 8:00-9:00 a.m. on Tuesday, 3 Apr. 2007). Once selected, user 46 may e.g. right-click the pointing device controlling onscreen pointer 106, resulting in calendar server application 20 and/or calendar client application 22 rendering pop-up window 108. While pop-up window 108 is shown to include only one option, namely "schedule meeting", this is for illustrative purposes only and is not intended to be a limitation of this disclosure, as the number of options included within pop-up window 108 maybe increase or decrease depending on the design criteria and user need.

Figure 3:
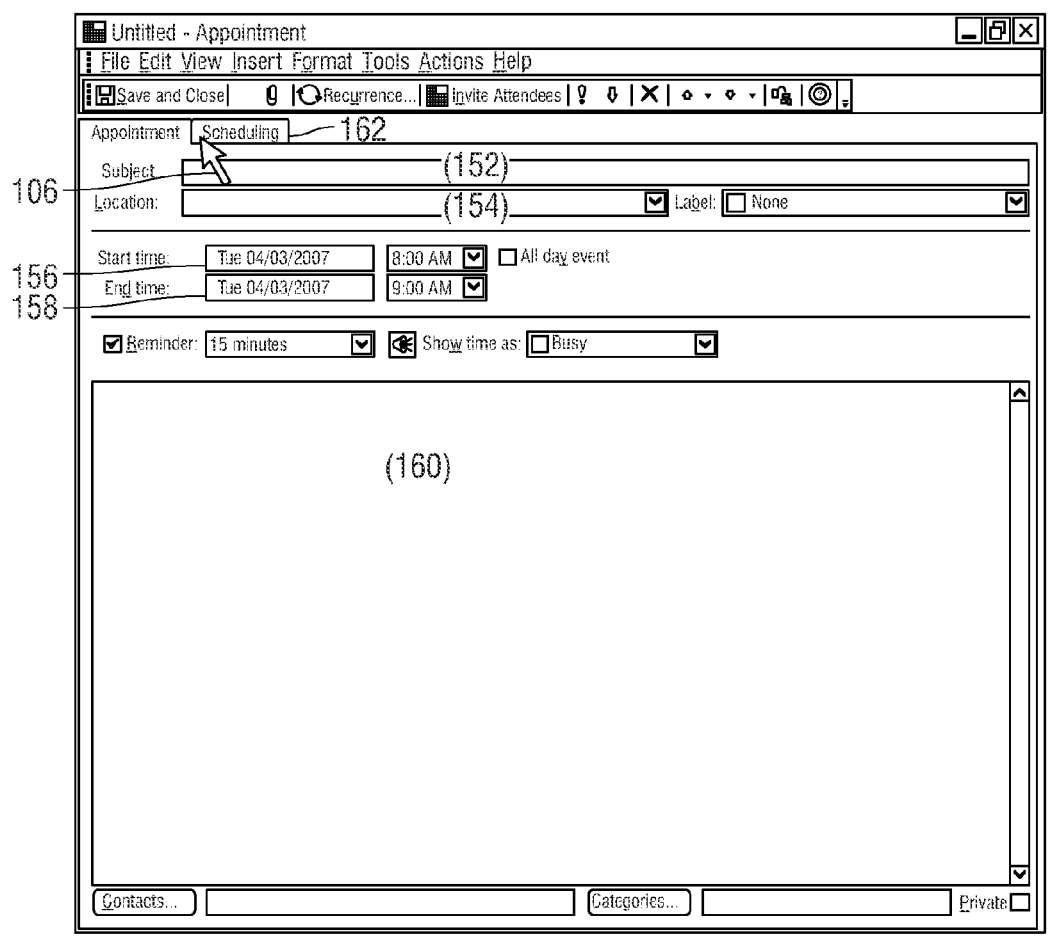
FIG. 3 is a diagrammatic view of a display screen rendered by the calendar client application and/or the calendar server application of FIG. 1.

Referring also to FIG. 3 and upon selecting "schedule meeting" from pop-up window 108, calendar server application 20 and/or client calendar application 22 may render meeting window 150. Meeting window 150 may include a plurality of fields such as: the subject field 152 (which allows user 46 to define the subject of the meeting); location field 154 (which allows user 46 to define the location of the meeting); start time field 156 (which allows user 46 to define the start date/time of the meeting); end time field 158 (which allows user 46 to define the end date/time of the meeting); and comment field 160 (which allows user 46 to define e.g. dial in information; web address information, and video conference information).

Figure 4:
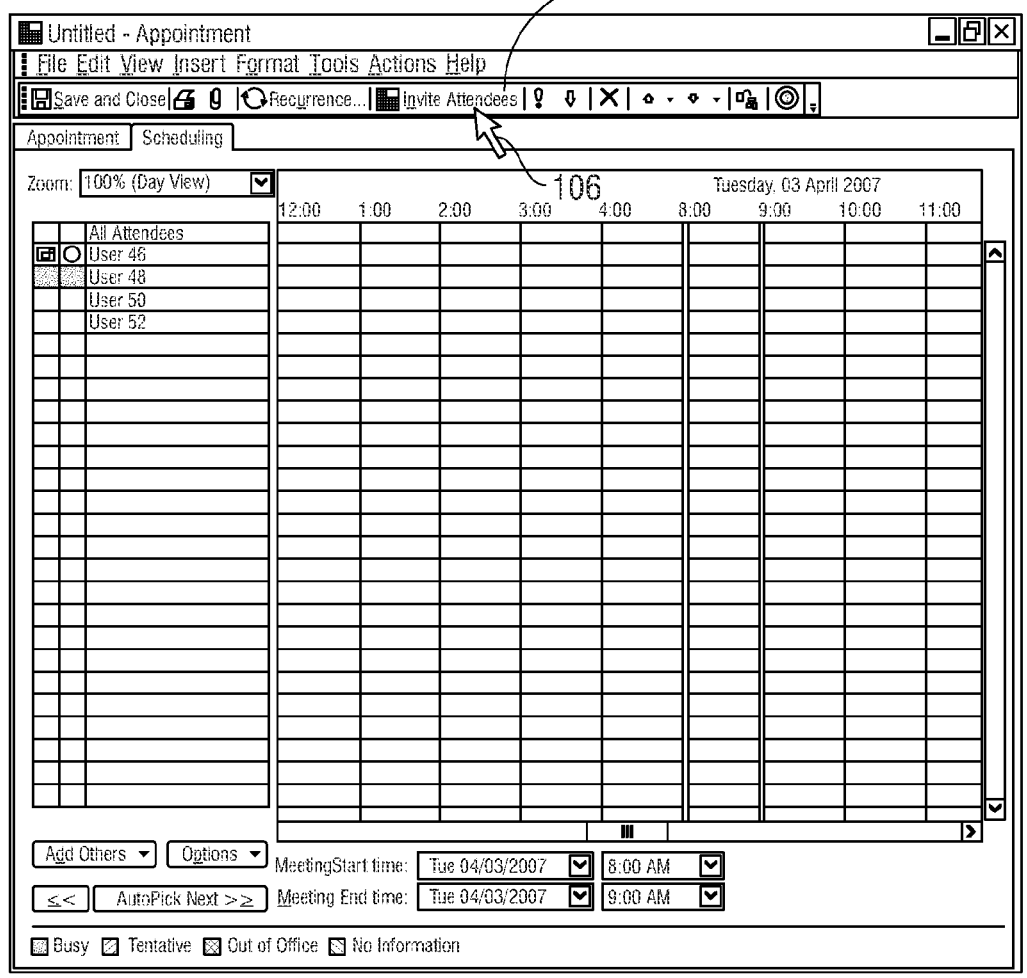
FIG. 4 is a diagrammatic view of a display screen rendered by the calendar client application and/or the calendar server application of FIG. 1.

User 46 may select "scheduling" tab 162 using on-screen pointer 106. Once selected and referring also to FIG. 4, calendar server application 20 and/or client calendar application 22 may render scheduling window 200 which may allow user 46 to invite one or more attendees (e.g. user 48, user 50, user 52) to the meeting being scheduled. Accordingly, by selecting the "invite attendees" button 202 using on-screen pointer 106, an attendee window (not shown) may be rendered by calendar server application 20 and/or client calendar application 22 that allows user 46 to select one or more attendees for inviting to the meeting being scheduled. For illustrative purposes, scheduling window 200 is shown to have user 46, user 48, user 50, and user 52 invited to attend the meeting.

When scheduling a meeting, the person scheduling the meeting (e.g. user 46) may be automatically designated as the moderator of the meeting. Alternatively, meeting window 150 and/or scheduling window 200 may include a moderator field (not shown) that allows the person scheduling the meeting to designate a moderator.

Figure 5:
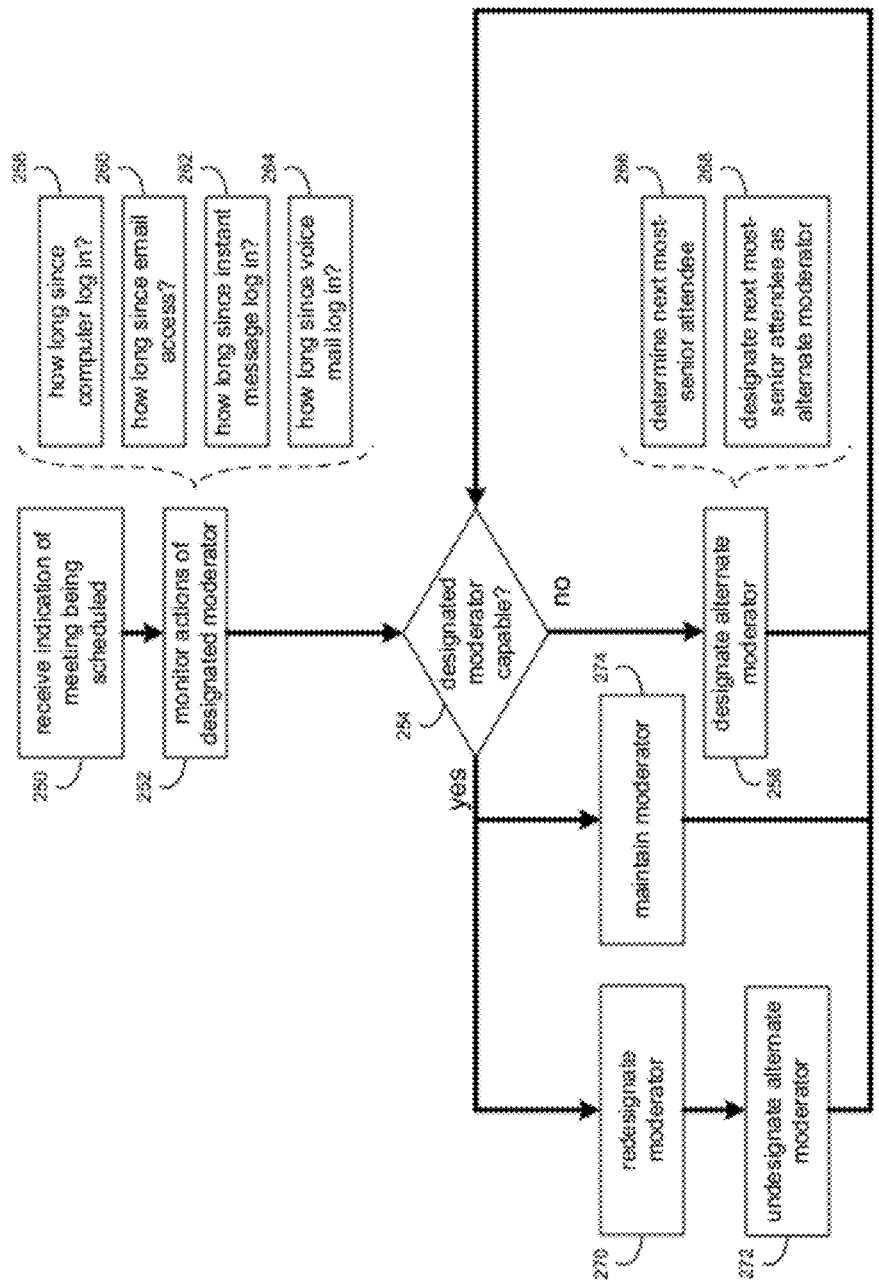
FIG. 5 is a flowchart of the moderator delegation process of FIG. 1.

Referring also to FIG. 5, moderator delegation process 10 may monitor calendar server application 20 and/or calendar client application 22 to determine when meetings are being scheduled. Upon receiving 250 an indication that a meeting was scheduled between a plurality of attendees (in which at least one of the attendees was designated a moderator of the meeting), moderator delegation process 10 may monitor 252 the actions of the designated moderator to determine 254 if the designated moderator is capable of performing the moderator responsibilities associated with being the designated moderator.

For example and as discussed above, assume that user 46 (as the user who scheduled the meeting) is automatically designated the moderator of the meeting. Assume for illustrative purposes that moderator delegation process 10 monitors the meeting scheduling activity that occurs within calendar server application 20. Accordingly, when user 46 schedules the meeting (to which user 48, user 50, user 52 are invited to attend), moderator delegation process 10 may receive an indication that the meeting is being scheduled from calendar server application 20. Such indication may be automatically provided from calendar server application 20 to moderator delegation process 10. Alternatively, moderator delegation process 10 may be an applet or sub-process executed within calendar server application 20 and may, therefore, proactively monitor the scheduling of meetings.

Upon moderator delegation process 10 receiving 250 an indication that a meeting was scheduled for 8:00-9:00 a.m. on Tuesday, 3 Apr. 2007 for which user 46 was the designated moderator, moderator delegation process 10 may begin to monitor 252 the actions of user 46 to determine 254 if user 46 is capable of performing the moderator responsibilities associated with being the designated moderator.

Examples of such moderator responsibilities may include but are not limited to: inviting attendees to the meeting, uninviting attendees from the meeting, starting the meeting, stopping the meeting, rescheduling the meeting, obtaining a meeting space for the meeting, obtaining audio/video equipment for the meeting, obtaining food for the meeting, and generally running the meeting.

If it is determined 254 that the designated moderator (e.g., user 46) is incapable of performing the moderator responsibilities, moderator delegation process 10 may designate 256 an alternate moderator chosen from the plurality of meeting attendees. Accordingly, moderator delegation process 10 may monitor 252 the actions of user 46 once the meeting has been scheduled to determine 254 if an alternate moderator should be designated 256.

Examples of the manner in which moderator delegation process 10 may monitor 252 the actions of user 46 (i.e., the designated moderator) may include but are not limited to: determining 258 how long it has been since the designated moderator has logged into their computer system; determining 260 how long it has been since the designated moderator has accessed their email account; determining 262 how long it has been since the designated moderator has logged into their instant messaging account; and determining 264 how long it has been since the designated moderator has checked their voice mail. In the event that one or more of these monitored 252 time frames exceeds a user-defined amount (e.g., three days), moderator delegation process 10 may determine 254 that user 46 is incapable of performing the moderator responsibilities.

While the above-described list is meant to be illustrative, it is not intended to be all inclusive. Accordingly, other systems and/or events may be monitored. For example, assume that user 46 regularly logs into a web-based service offered by a third party. If moderator delegation process 10 has the ability to determine whether user 46 has logged into that web-based service recently, moderator delegation process 10 may monitor the web-based service and use this information when determining 254 if user 46 is incapable of performing the above-described moderator responsibilities.

While the above-described list is intended to be illustrative, it is not intended to be all inclusive. Accordingly, other methodologies in which the moderator delegation process 10 may monitor 252 the actions of user 46 are considered to be within the scope of this disclosure.

Assume for illustrative purposes that user 46 (i.e. the designated moderator) got sick on Tuesday, 27 Mar. 2007 (i.e. one week prior to the Tuesday, 3 Apr. 2007 meeting). Further, assume that user 46 is bedridden and therefore cannot access the resources of the organization for which he works (i.e., Company X). Accordingly, the likelihood of the meeting be successful may be compromised, as the moderator responsibilities that user 46 needs to handle prior to the meeting will most likely not be taken care of. For example, as user 46 is bedridden, user 46 may not be able to reserve space for the meeting. Additionally, user 46 may not be able to order a lunch for the meeting, schedule the required audio/video equipment, and allow another user (not shown) to be invited to the meeting. Further, in the event that user 46 is still out of work at the time of the meeting, the likelihood of a successful meeting is further compromised, as user 46 will not be able to run the meeting.

Accordingly, if after monitoring 252 the actions of user 46, moderator delegation process 10 determines 254 that user 46 is incapable of performing the moderator responsibilities associated with running the meeting, moderator delegation process 10 may designate 256 on alternate moderator chosen from the other attendees of the meeting (e.g. user 48, user 50, user 52).

When designating 256 an alternate moderator, moderator delegation process 10 may determine 266 the next most-senior attendee chosen from the plurality of attendees. Moderator delegation process 10 may then designate 268 the next most-senior attendee as the alternate moderator. For example, assume that user 48 has been with the company (i.e., Company X) for over 10 years, while user 50 and user 52 have each been with Company X for less than five years. When designating 256 an alternate moderator, moderator delegation process 10 may designate 268 user 48 as the alternate moderator after determining 266 that user 48 is substantially senior to users 50, 52.

When moderator delegation process 10 designates 256 an alternate moderator that is chosen from the other attendees of the meeting, this may be a fully-automated process. Continuing with the above-stated example, upon moderator delegation process 10 determining 254 that user 46 is incapable of performing the moderator responsibilities associated with running the meeting, moderator delegation process 10 may automatically designate 256 an alternate moderator (e.g. user 48). Further, moderator delegation process 10 may automatically generate an email message that is sent to both user 46 and user 48, explaining that user 46 has been undesignated as moderator and that user 48 has been designated 256 as alternate moderator.

While moderator delegation process 10 is described above as determining the most senior attendee by analyzing years of experience with Company X, this is for illustrative purposes only and is not intended to be a limitation of this disclosure, as other configurations are possible. For example, moderator delegation process 10 may analyze other criteria to determine the next most-senior attendee, such as: years since graduation from high school, college, law school, or medical school; chronological age; pay grade; and job title. Assume for illustrative purposes that, due to the illness of user 46, moderator delegation process 10 determines 254 that user 46 is incapable performing the moderator responsibilities associated with being the designated moderator, moderator delegation process 10 may then designate 256 user 48 as an alternate moderator.

Moderator delegation process 10 may continuously monitor the actions of user 46 (i.e., the designated moderator) after the designation 256 of user 48 as alternate moderator to determine 254 if user 46 is once again capable of performing the moderator responsibilities associated with being the designated moderator.

Continuing with the above-stated example, assume that after getting ill on Tuesday, 27 Mar. 2007, user 46 was bedridden for several days and, therefore, unable to log onto the computer system of Company X, access the e-mail system of Company X, logon to the instant messaging system of Company X, and/or log into the voicemail system of Company X. Accordingly, moderator delegation process 10 designated 256 user 48 as the alternate moderator.

However, assume that after four days of bed rest, user 46 is feeling considerably better and, therefore, logs onto the computer system of Company X, accesses the e-mail system of Company X, logs onto the instant messaging system of Company X, and/or logs onto the voicemail system of Company X. As moderator delegation process 10 may continuously monitor the actions of user 46 after the designation 256 of user 48 as alternate moderator, moderator delegation process 10 may determine 254 that user 46 is once again capable of performing the moderator responsibilities associated with being the designated moderator. Accordingly, upon making this determination 254, moderator delegation process 10 may redesignate 270 user 46 as moderator and may undesignate 272 user 48 as alternate moderator.

When moderator delegation process 10 redesignates 270 user 46 as moderator and undesignates 272 the alternate moderator (e.g., user 48), this redesignation/undesignation process may be fully automated. Further, moderator delegation process 10 may automatically generate an email message that is sent to both user 46 and user 48, explaining that user 46 has been redesignated 270 as moderator and that user 48 has been undesignated 272 as alternate moderator.

Again, moderator delegation process 10 may continue to monitor the actions of user 46 to ensure that user 46 is still capable of performing the moderator responsibilities associated with being the designated moderator. In the event that moderator delegation process 10 subsequently determines 254 that user 46 is still capable of performing the moderator responsibilities, moderator delegation process 10 may maintain 274 user 46 as the designated moderator. However, in the event that e.g. user 46 has a relapse and gets sick once again, upon determining 254 that user 46 is again incapable of performing the moderator responsibilities, moderator delegation process 10 may once again designate 256 an alternate moderator.

A number of implementations have been described. Nevertheless, it will be understood that various modifications may be made. Accordingly, other implementations are within the scope of the following claims.

What is claimed is:
1. A method comprising:
 receiving an indication of a meeting being scheduled between a plurality of attendees, wherein at least one of the attendees is designated a moderator of the meeting;

monitoring, by a processor, one or more actions of the designated moderator to determine if the designated moderator is capable of performing one or more moderator responsibilities associated with being the designated moderator, wherein monitoring the one or more action of the designated moderator includes determining whether an amount of time since the designated moderator has accessed an account is exceeded; and in response to determining that the amount of time since the designated moderator has accessed the account is exceeded, determining that the designated moderator is incapable of performing the one or more moderator responsibilities and designating an alternate moderator chosen from the plurality of attendees.

2. The method of claim 1 wherein the meeting is an in-person meeting.

3. The method of claim 1 wherein the meeting is a virtual meeting chosen from the group consisting of: an instant-message based meeting; a web-based meeting; a telephone conference; and a video conference.

4. The method of claim 1 wherein the account includes: a computer system of the designated moderator.

5. The method of claim 1 wherein the account includes: an email account of the designated moderator.

6. The method of claim 1 wherein the account includes:
an instant messaging account of the designated moderator.

7. The method of claim 1 wherein the account includes:
a voice mail account of the designated moderator.

8. The method of claim 1 wherein designating an alternate moderator chosen from the plurality of attendees includes:
determining a next most-senior attendee from the plurality of attendees; and
designating the next most-senior attendee as the alternate moderator.

9. The method of claim 1 further comprising:
continuing to monitor the actions of the designated moderator after the designation of an alternate moderator to determine if the designated moderator is again capable of performing the one or more moderator responsibilities associated with being the designated moderator.

10. The method of claim 9 further comprising:
if it is determined that the designated moderator is again capable of performing the one or more moderator responsibilities, undesignating the alternate moderator and redesignating the designated moderator.

11. A computer program product residing on a computer readable medium having a plurality of instructions stored thereon which, when executed by a processor, cause the processor to perform operations comprising:
receiving an indication of a meeting being scheduled between a plurality of attendees, wherein at least one of the attendees is designated a moderator of the meeting;

monitoring, by a processor, one or more actions of the designated moderator to determine if the designated moderator is capable of performing one or more moderator responsibilities associated with being the designated moderator, wherein monitoring the one or more action of the designated moderator includes determining whether an amount of time since the designated moderator has accessed an account is exceeded; and in response to determining that the amount of time since the designated moderator has accessed the account is exceeded, determining that the designated moderator is incapable of performing the one or more moderator responsibilities and designating an alternate moderator chosen from the plurality of attendees.

12. The computer program product of claim 11 wherein the meeting is an in-person meeting.

13. The computer program product of claim 11 wherein the meeting is a virtual meeting chosen from the group consisting of: an instant-message based meeting; a web-based meeting; a telephone conference; and a video conference.

14. The computer program product of claim 11 wherein the account includes:
a computer system of the designated moderator.

15. The computer program product of claim 11 wherein the account includes:
an email account of the designated moderator.

16. The computer program product of claim 11 wherein the account includes:
an instant messaging account of the designated moderator.

17. The computer program product of claim 11 wherein the account includes:
a voice mail account of the designated moderator.

18. The computer program product of claim 11 wherein the instructions for designating an alternate moderator chosen from the plurality of attendees include instructions for:
determining a next most-senior attendee from the plurality of attendees; and
designating the next most-senior attendee as the alternate moderator.

19. The computer program product of claim 11 further comprising instructions for:
continuing to monitor the actions of the designated moderator after the designation of an alternate moderator to determine if the designated moderator is again capable of performing the one or more moderator responsibilities associated with being the designated moderator.

20. The computer program product of claim 19 further comprising instructions for:
if it is determined that the designated moderator is again capable of performing the one or more moderator responsibilities, undesignating the alternate moderator and redesignating the designated moderator.

* * * * *